(No Model.) 2 Sheets—Sheet 1.

F. KOSKUL.
COMPOUND LUMBER FOR VENEERS, &c.

No. 454,362. Patented June 16, 1891.

Witnesses:
Inventor:

(No Model.) 2 Sheets—Sheet 2.
F. KOSKUL.
COMPOUND LUMBER FOR VENEERS, &c.
No. 454,362. Patented June 16, 1891.
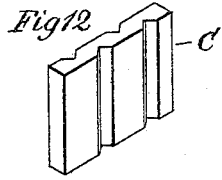
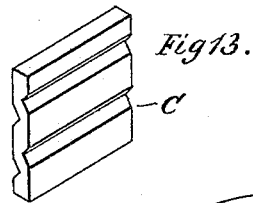
Fig 12. Fig 7. Fig 13.
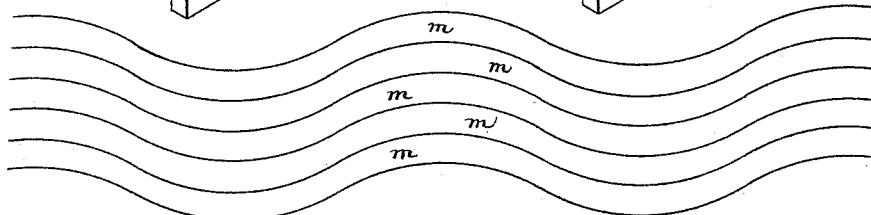
Fig 8.
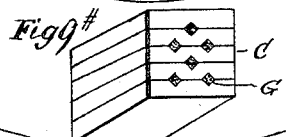
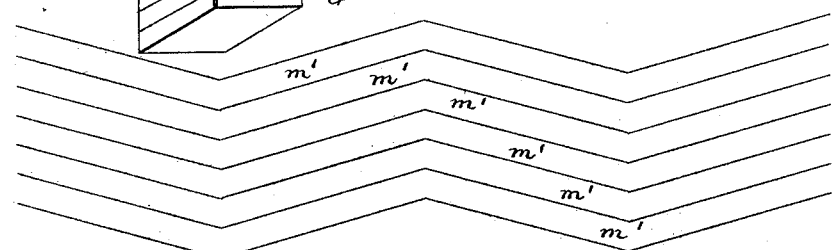
Fig 9.
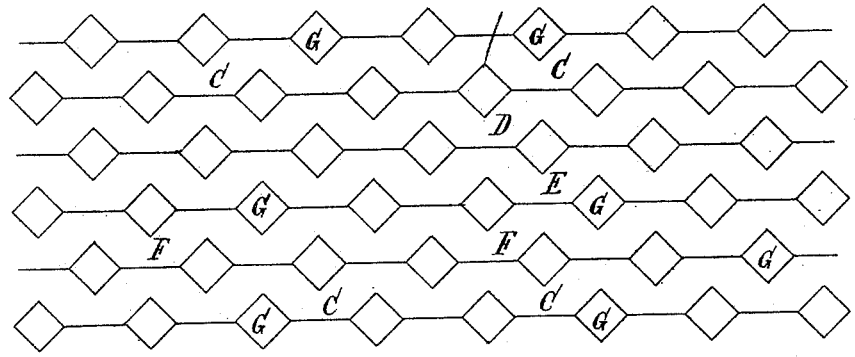
Fig 10.
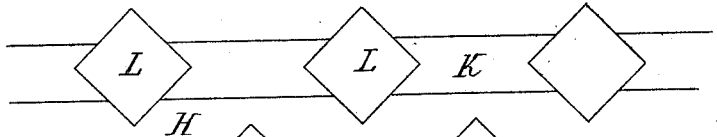
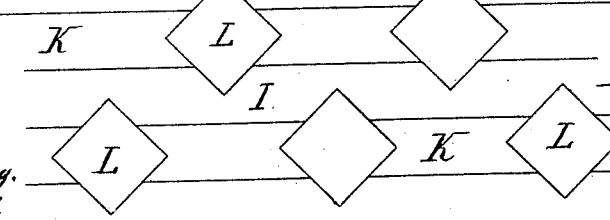
Witnesses:
J. P. Theo Lang.
E. J. Fenwick
Inventor
Fred'k Koskul
by his attorneys
Mason, Fenwick & Lawrence

UNITED STATES PATENT OFFICE.

FREDERICK KOSKUL, OF WILLIAMSPORT, PENNSYLVANIA.

COMPOUND LUMBER FOR VENEERS, &c.

SPECIFICATION forming part of Letters Patent No. 454,362, dated June 16, 1891.

Application filed September 6, 1890. Serial No. 364,109. (No model.)

*To all whom it may concern:*

Be it known that I, FREDERICK KOSKUL, a citizen of the United States, residing at Williamsport, in the county of Lycoming and State of Pennsylvania, have invented certain new and useful Improvements in Compound Lumber for Veneers, &c.; and I do hereby declare the following to be a full, clear, and exact description of the invention, such as will enable others skilled in the art to which it appertains to make and use the same.

My invention consists in a novel pile from which to make ornamental veneers, slabs, or blocks, and in a mode of manufacturing said piles.

The object of my invention is to cheapen and facilitate the production of ornamental veneers, slabs, blocks, or other analogous things representing inlay effect, the same to serve as veneering on wood or other material or for flooring, table-tops, and other purposes.

Figure 1:
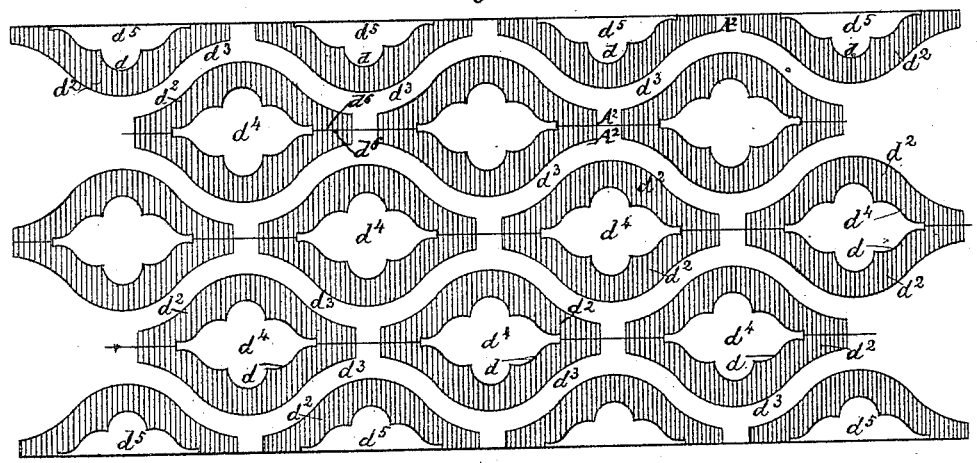
Figure 2:
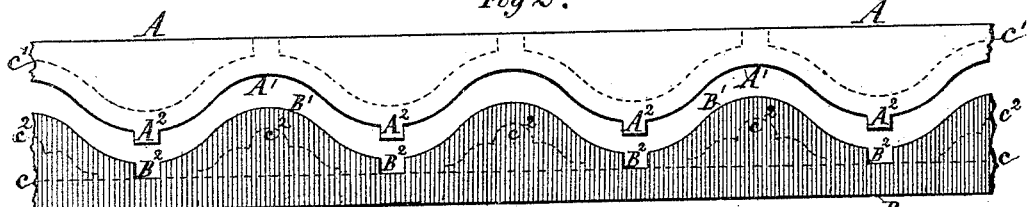
Figure 3:
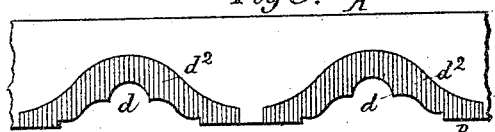
Figure 4:
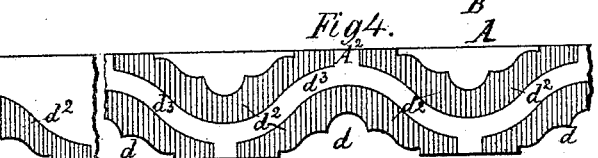
Figure 11:
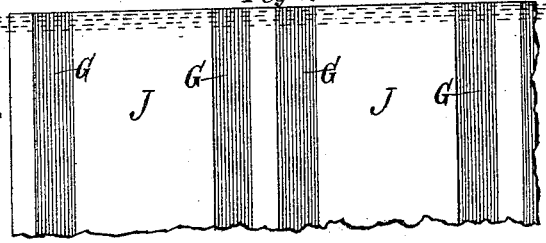

In the accompanying drawings, Figure 1 represents an end view of a pile manufactured in accordance with my invention. Fig. 2 is an end view of two pieces of wood as they appear after having been ornamentally cut to match one another when placed close together, the dotted lines $c$ $c'$ $c^2$ in this view indicating points where subsequent cutting takes place after the pieces of lumber are glued together. Fig. 3 is an end view of the pieces shown in Fig. 2 with ornamentations cut upon one of them, the cutting being done while the two pieces shown in Fig. 2 are glued together, and after the edge waste-strip of the second piece has been cut off at the point indicated by the dotted line $c$ in Fig. 2. Fig. 4 is also an end view showing both the pieces shown in Fig. 2 provided with ornamentations, the same being right and left. In this illustration the ornamental portions have been cut out of pieces similar to those shown in Fig. 2 and while glued to a continuous piece or strip after the manner illustrated in this figure. Figs. 5, 6, 7, 8, 9, 9½, and 10 illustrate other plans of carrying out my invention, and Fig. 11 is a broken side view of a pile manufactured according to my invention, the dotted lines indicating points at which the veneers are to be cut off, which may be changed according to the thickness required. Figs. 12 and 13 illustrate ways of ornamentally cutting boards on their broad surfaces across and with the grain.

A in the accompanying drawings, Fig. 2, indicates a piece of lumber of any suitable color and character, and B another piece of lumber of any suitable color and character. It is preferable to have the pieces of lumber of different color and character, but it is not necessary in all cases to use lumber of different color; but this mode may be adopted at pleasure. In cases where the wood is used so as to show its grain endwise the woods may be all of one color and character; so, also, in cases where the pieces are set to show both endwise and lengthwise grain, and such wood, if ash, will produce an excellent effect.

The pieces A and B are ornamentally cut on their respective inner surfaces with a serpentine configuration, as $A'$ $B'$, the continuity of the serpentine lines being interrupted on the pieces A by rectangular configurations $A^2$ and on the piece B by matching rectangular configurations $B^2$. The pieces A and B are placed close together and united firmly together, preferably by glue, so that one sustains the other during the further configuration of the respective pieces, and next the waste portion or strip outside the dotted line $c$ $c$ is cut off from the strip B, and in the surface of the portion between the configurations $B^2$ ornamentations, as $d$, Figs. 3 and 4, are cut, and the ornamental portions $d^2$ thus produced, while glued to and sustained by the serpentine strip, are utilized for forming ornamental configurations, as $d^4$ in Fig. 1, and the same, duplicated in the same manner as described to any number desired, are arranged in a manner as will be presently described, so as to form a pile from which to produce ornamental veneers, slabs, or blocks. The serpentine strips or pieces $d^3$, with rectangular configurations $A^2$, are formed by cutting into the board A on the dotted line $c'$, Fig. 2, and in the ornamental cavities thus produced in the piece A halves of ornamented pieces, as $d^2$, are placed and glued.

In forming a pile, as illustrated in Fig. 1, the serpentine strips $d^3$, with the ornamental pieces $d^2$ attached to them, are arranged so that the configurations $A^2$ adjoin, and the straight portions $d^6$ of the ornamental pieces $d^2$ also adjoin, and thereupon the solid filling-pieces $d^4$ are inserted and the whole glued together. The sides of the pile are finished with single ornamental pieces, as $d^2$, placed against and glued to serpentine strips $d^3$, as illustrated. Into the ornamental spaces $d$, formed by the ornaments $d^2$, are fitted ornamental filling-pieces $d^4$, and also in the half-ornamental formations are fitted ornamental pieces $d^5$, cut from suitable wood on a pattern exactly matching one-half of the inner ornamentations of the pieces $d^2$. These side filling-pieces are preferably made of different-colored woods or are set to show their grain endwise in respect to pieces having their grain running horizontally. It will be seen that the respective parts of the pile are so shaped at $A^2$ and $B^2$ and at other points where a union of one with another takes place that the said parts aid in holding one another together, while at the same time no abrupt projections are formed.

Figure 5:
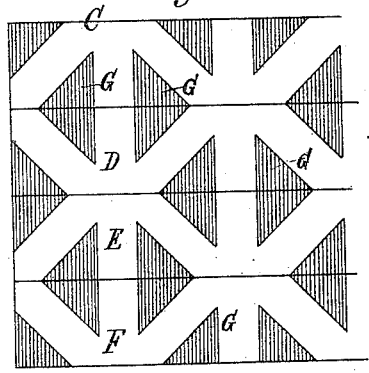

In Fig. 5 the pile is represented as formed of a series of continuous pieces C D E F, having angular ornamental configurations cut in the respective side surfaces of each piece, and the said pieces after being thus cut are placed close together and glued, and into the ornamental spaces formed between the pieces solid angular filling-pieces G of a suitable wood are inserted, as illustrated. It is preferable in some cases to use wood for the filling-pieces G which shows the grain endwise, and it will be very tasteful and attractive to use woods of different colors in the manufacture of these filling-pieces.

Figure 6:
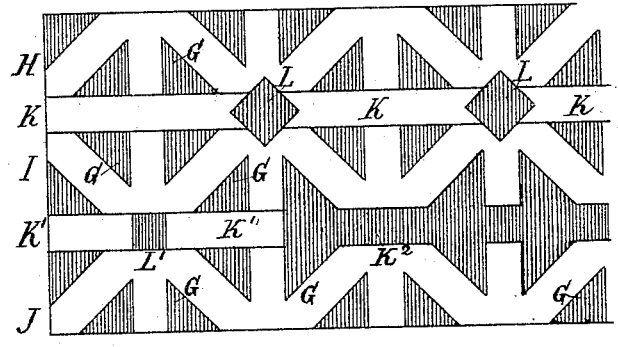

In Fig. 6 pieces H I J are shown, and between the pieces H I other pieces K K' are placed, and at intervals along pieces, as K, angular vertical pieces L are placed, and between the pieces I J vertical pieces, as K' K², the latter having matching ornaments to fit into the angular ornamentations of the pieces I J, are shown. The pieces, as K', are divided by a vertical ornamental filling-piece L'. All the pieces, when adjusted as shown in Fig. 6, are glued in position; but previously to the gluing or subsequently thereto angular ornamental filling-pieces, as G, are inserted into the angular ornamental configurations of the pieces H I J both interiorly and exteriorly of the pile, as illustrated.

In Fig. 7 I have illustrated a series of curvilinear or serpentine-shaped pieces $m$, glued together to form an ornamental pile. In Fig. 8 a similar pile to Fig. 7 is formed of zigzag-cut ornamental pieces $m'$.

In Fig. 9 a series of continuous pieces C D E F with angular configurations cut on both of their broad side surfaces are shown, and angular filling-pieces G are inserted into the ornamental spaces formed by a union of the pieces, and in Fig. 10 a pile is shown formed of plain-surfaced pieces K, having ornamentations in their ends, and of continuous pieces H I, having ornamentations on their broad side surfaces, and into the ornamental spaces vertical filling-pieces L are placed and the whole glued together.

The broad side surfaces of the piles formed of pieces, as in Figs. 7, 8, 9, 9½, and 10, may be flat and plain, as in Fig. 9½, or they may be finished with ornamentations adapted to the different designs.

The designs represented by Figs. 5, 6, 7, 8, 9, and 10, as well as that represented in Fig. 1, may be varied according to the taste of the designer without departing from my invention, and in placing the different pieces forming the pile the grains of the woods may be placed so that some show endwise and others crosswise; but this is optional.

It may be practicable to bind the parts of the pile together, and thus the necessity of gluing the parts together before the veneers are set in position avoided, as set forth in Letters Patent No. 436,041, dated September 9, 1890, heretofore granted to me.

It is obvious that the designs of the veneer piles may be varied to any possible extent, or that the ornamentations, while wholly unlike either of those shown in the figures of the drawings and of more or less elaborate character, may be changed as taste or necessity may require.

It will be understood that the leading novelty of my invention herein described lies in the production of solid piles of wood cut with ornamental configurations on the broad surfaces of pieces which are to be joined after being so cut, the cutting operation being either with or against the grain, and in cutting from said piles veneers, slabs, or blocks which are solid, and therefore my invention embraces the several descriptions or designs of piles represented in the drawings, and all other analogous solid piles for veneers so long as the configurations are cut on the broad sides of the pieces from edge to edge or end to end, as illustrated in Figs. 12 and 13 and the other figures, or in any other equivalent way.

By my invention the production of highly ornamental solid veneers, slabs, or blocks for use as table-tops or other furniture, and tiling, flooring, and other decorative finish for structures or buildings and other like uses can be very cheaply and successfully produced.

My herein-described invention or method overcomes the imperfections and the difficulties attending the methods heretofore adopted of constructing piles of wood from which veneers are to be sawed, inasmuch as it renders practicable the ornamenting or shaping of each of the pieces or boards with rotary cutters or molding cutters, which operate upon the surfaces of the boards and produce a perfect jointing-surface, and thus is avoided the necessity of sawing through the pile of wood with a scroll-saw in order to ornament or shape the side surfaces of the pieces which are employed to make up the pile from which the veneers are to be sawed, which sawing operation is a very troublesome thing, and results in very poor jointing-surfaces.

What I claim as my invention is—

1. The within-described mode of constructing sectional piles or blocks of wood from which solid portions are to be sawed or cut to form veneers or slabs, said mode consisting in shaping boards with ornamental matching or fitting formations on their broad surfaces, either with or across the grain, previously to their being joined, then closely adjoining the said shaped pieces upon one another so as to form a solid pile, the said adjoined pieces being firmly cemented together or held together by other suitable means, substantially as described.

2. The within-described mode of constructing sectional piles or blocks of wood from which solid portions are to be sawed or cut to form veneers or slabs, said mode consisting in ornamentally shaping boards on their broad surfaces, either with or across the grain, previously to their being joined, then closely adjoining the said shaped pieces in contact with intermediate ornamental pieces which fill the ornamental cuts produced on the broad surfaces of the boards in their manufacture and make the pile solid, the said adjoined pieces and the ornamental filling-pieces being firmly cemented together or held together by other suitable means, substantially as described.

3. A pile of wood from which veneers or slabs are to be cut, formed of sections having respectively ornamental formations on each their broad sides, such piles being solid and their broad surfaces finished on straight planes by inserting ornamental filling-pieces having one plain side into the exposed cuts or ornamental formations, substantially as described.

In testimony whereof I hereunto affix my signature in presence of two witnesses.

FREDERICK KOSKUL.

Witnesses:
WILLIAM PARNELL HARDING,
WILLIAM ERNEST WOELLMER.